(12) United States Patent
Kim et al.

(10) Patent No.: US 7,905,625 B2
(45) Date of Patent: Mar. 15, 2011

(54) FLUORESCENT LAMP, BACKLIGHT ASSEMBLY HAVING THE SAME AND METHOD OF ASSEMBLING THE SAME

(75) Inventors: Hyun-Jin Kim, Seoul (KR); Seok-Hyun Nam, Seoul (KR); Sang-Hyuck Yoon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 239 days.

(21) Appl. No.: 12/033,592

(22) Filed: Feb. 19, 2008

(65) Prior Publication Data
US 2008/0198591 A1 Aug. 21, 2008

(30) Foreign Application Priority Data

Feb. 20, 2007 (KR) .................. 10-2007-0016894

(51) Int. Cl.
*F21S 4/00* (2006.01)

(52) U.S. Cl. .................. 362/225; 362/97.1; 362/217.01; 362/217.08; 362/217.09; 313/491; 313/493; 313/494; 313/634

(58) Field of Classification Search .................. 313/225, 313/491, 493, 494, 634, 623–625; 362/217.01, 362/225, 217.08, 217.09, 217.1, 262; 439/612; 445/26, 49

See application file for complete search history.

(56) References Cited

U.S. PATENT DOCUMENTS

| | | | | |
|---|---|---|---|---|
| 3,753,027 A * | 8/1973 | Kolkman | .................. | 313/318.01 |
| 4,803,600 A * | 2/1989 | Pepping | .................. | 362/217.16 |
| 7,042,167 B2 * | 5/2006 | Park et al. | ...................... | 315/229 |
| 7,192,159 B2 * | 3/2007 | Huang | .......................... | 362/225 |
| 7,387,419 B2 * | 6/2008 | Jeong et al. | .................... | 362/561 |
| 7,592,750 B2 * | 9/2009 | Lin et al. | ........................ | 313/607 |
| 2003/0086255 A1 * | 5/2003 | Moon et al. | ..................... | 362/97 |
| 2005/0063170 A1 * | 3/2005 | Lee et al. | ......................... | 362/31 |

* cited by examiner

*Primary Examiner* — Evan Dzierzynski
(74) *Attorney, Agent, or Firm* — F. Chau & Associates, LLC (57) ABSTRACT

A fluorescent lamp includes a fluorescent tube, a thermal electron, a first cover electrode and a second cover electrode. The fluorescent tube has a discharge space. The thermal electron emitting part is disposed in the discharge space. The first cover electrode is disposed at an end portion of the fluorescent tube, and is electrically connected to a first end portion of the thermal electron emitting part. The second cover electrode is spaced apart from the first cover electrode disposed at the end portion of the fluorescent tube, and is electrically connected to a second end portion of the thermal electron emitting part. The thermal electron emitting part is electrically connected to the first cover electrode and the second cover electrode.

12 Claims, 11 Drawing Sheets

FLUORESCENT LAMP, BACKLIGHT ASSEMBLY HAVING THE SAME AND METHOD OF ASSEMBLING THE SAME

CROSS-REFERENCE TO RELATED APPLICATION

The present application claims priority under 35 U.S.C. §119 to Korean Patent Application No. 2007-16894, filed on Feb. 20, 2007, the contents of which are herein incorporated by reference in their entirety.

BACKGROUND OF THE INVENTION

1. Technical Field

The present disclosure relates to a fluorescent lamp, a backlight assembly having the fluorescent lamp and a method of assembling the backlight assembly, and more particularly, to a fluorescent lamp generating light using thermal electrons, a backlight assembly having the fluorescent lamp and a method of assembling the backlight assembly.

2. Discussion of the Related Art

A liquid crystal display (LCD) device displays an image using liquid crystals having electrical and optical characteristics. The LCD device is thin, light and small.

The liquid crystals of the LCD device do not generate light so that the LCD device uses a backlight assembly generating the light.

The backlight assembly includes, for example, a cold cathode fluorescent lamp (CCFL), or a light-emitting diode (LED).

However, when the backlight assembly is operated through a scanning method, the luminance of the CCFL is decreased. In the scanning method, a plurality of CCFLs are sequentially turned on and turned off. A dimming range of the CCFL is restricted.

When the CCFL is received in a receiving container, a manufacturing process is complicated and a combining strength between the CCFL and the receiving container is decreased.

SUMMARY OF THE INVENTION

According to an embodiment of the present invention, a fluorescent lamp includes a fluorescent tube, a thermal electron, a first cover electrode and a second cover electrode. The fluorescent tube has a discharge space. The thermal electron emitting part is disposed in the discharge space. The first cover electrode is disposed at an end portion of the fluorescent tube, and is electrically connected to a first end portion of the thermal electron emitting part. The second cover electrode is spaced apart from the first cover electrode disposed at the end portion of the fluorescent tube, and is electrically connected to a second end portion of the thermal electron emitting part. The thermal electron emitting part is electrically connected to the first cover electrode and the second cover electrode.

The fluorescent lamp may further include an insulating part interposed in a gap between the first and second cover electrodes.

The insulating part may include metal oxide.

The insulating part may protrude toward the discharge space.

The insulating part may partially fill the gap between the first and second cover electrodes so that an alignment recess is formed.

The first and second may cover electrodes have semi-cylindrical cap shapes.

The first and second cover electrodes may partially cover an outer surface of the fluorescent tube.

The second cover electrode may have a cylindrical shape, and the first cover electrode may have a ring shape partially covering an outer surface of the fluorescent tube and being substantially parallel with the second cover electrode.

According to another embodiment of the present invention, a backlight assembly includes a receiving container, a fluorescent lamp and a fixing member. The fluorescent lamp includes a fluorescent tube, a thermal electron emitting part, a first cover electrode and a second cover electrode. The fluorescent tube has a discharge space. The thermal electron emitting part is disposed in the discharge space. The first cover electrode is disposed at an end portion of the fluorescent tube, and is electrically connected to a first end portion of the thermal electron emitting part. The second cover electrode is spaced apart from the first cover electrode and disposed at the end portion of the fluorescent tube, and is electrically connected to a second end portion of the thermal electron emitting part. The fixing member holds the fluorescent lamp and fixed to the receiving container. The thermal electron emitting part is electrically connected to the first cover electrode and the second cover electrode.

The fixing member may include a first fixing part electrically connected to the first cover electrode and a second fixing part electrically connected to the second cover electrode, and wherein the first fixing part is disposed to face the second fixing part.

The first and second cover electrodes may have semi-cylindrical cap shapes.

An alignment recess may be formed between the first and second cover electrodes of the fluorescent lamp.

The receiving container may further include an alignment protrusion protruding toward the discharge space and corresponding to the alignment recess.

The fluorescent lamp may further include an insulating part protruding toward the discharge space.

The fixing member may include a first fixing part electrically connected to the first cover electrode and a second fixing part electrically connected to the second cover electrode, and the second fixing part may be substantially parallel with the first fixing part.

The first and second cover electrodes may partially cover an outer surface of the fluorescent tube.

The second cover electrode and the first cover electrode may have a cylindrical cap shape and a ring shape partially covering an outer surface of the fluorescent tube and being substantially parallel with the second cover electrode.

The fixing member may include a first fixing part supporting the first electrode and a second fixing part supporting a side surface of the second electrode.

The backlight assembly may further include a plurality of fluorescent lamps substantially in parallel with each other in the receiving container, a plurality of fixing members fixing the fluorescent lamps to the receiving container, and a power supply member electrically connected to the fluorescent lamps in serial through the fixing members.

The fixing member may have a clip shape to hold the fluorescent lamp.

According to still another embodiment of the present invention, a method of assembling a backlight assembly is provided as follows. A fixing member is fixed to a receiving container. A fluorescent lamp including a fluorescent tube having a discharge space, a thermal electron emitting part disposed in the discharge space, a first cover electrode disposed at an end portion of the fluorescent tube and electrically connected to a first end portion of the thermal electron emitting part, and a second cover electrode spaced apart from the first cover electrode and disposed at the end portion of the fluorescent tube and electrically connected to a second end portion of the thermal electron emitting part is prepared. The fluorescent lamp is inserted in the fixing member, so that the fixing member holds the fluorescent lamp.

The fluorescent lamp is prepared by attaching a first silver paste electrically connected to the first end portion of the thermal electrode emitting part at the end portion of the fluorescent tube, and attaching a second silver paste electrically connected to the second end portion of the thermal electrode emitting part at the end portion of the fluorescent tube.

The fluorescent lamp is prepared by combining a conductive cap on the end portion of the fluorescent tube, and partially oxidizing the conductive cap.

BRIEF DESCRIPTION OF THE DRAWINGS

Exemplary embodiments of the present invention can be understood in more detail from the following descriptions taken in conjunction with the accompanying drawings, in which.

DESCRIPTION OF EXEMPLARY EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element or layer is referred to as being "on," "connected to" or "coupled to" another element or layer, it can be directly on, connected or coupled to the other element or layer or intervening elements or layers may be present.

Figure 1:
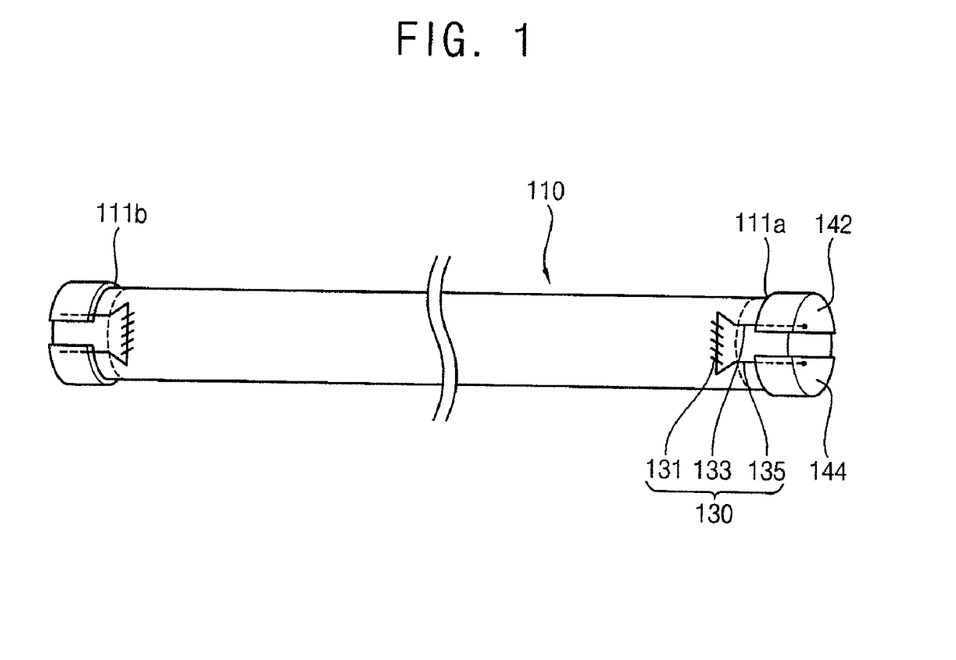
FIG. 1 is a perspective view illustrating a fluorescent lamp in accordance with an exemplary embodiment of the present invention.
Figure 2:
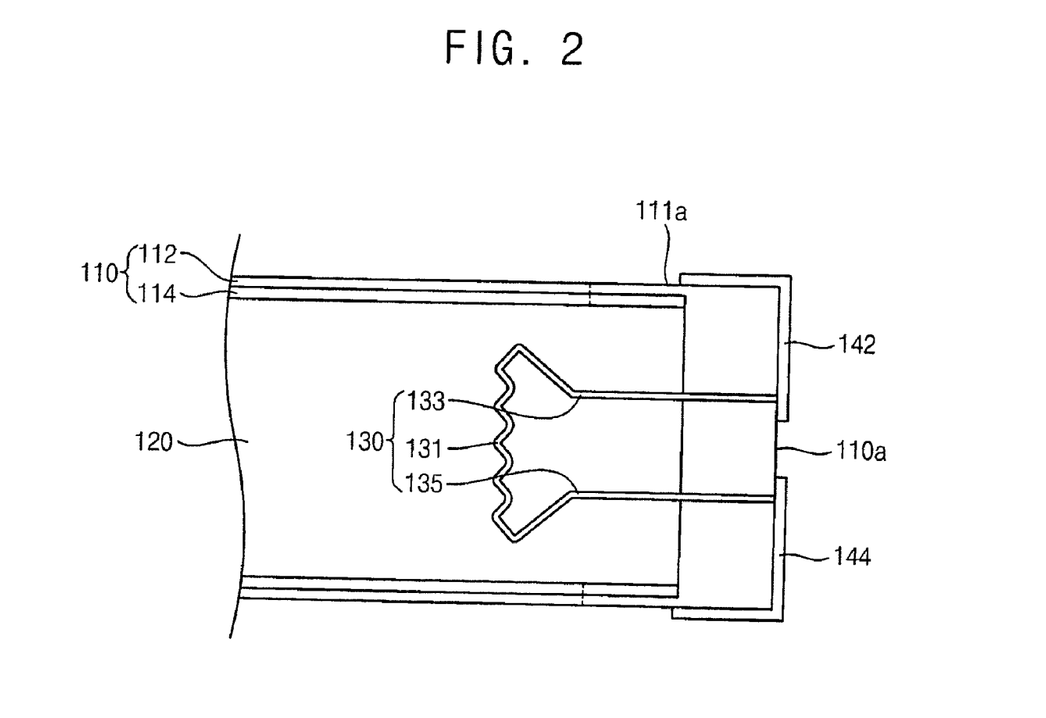
FIG. 2 is a cross-sectional view illustrating a fluorescent lamp in accordance with an exemplary embodiment of the present invention.

FIG. 1 is a perspective view illustrating a fluorescent lamp in accordance with an exemplary embodiment of the present invention. FIG. 2 is a cross-sectional view illustrating a fluorescent lamp in accordance with an exemplary embodiment of the present invention.

Referring to FIGS. 1 and 2, the fluorescent lamp includes a fluorescent tube 110, a thermal electron emitting part 130, a first cover electrode 142 and a second cover electrode 144. For example, the fluorescent lamp may include a thermal electron emitting part 130 disposed at an end portion 111a of the fluorescent tube 110, a first cover electrode 142 and a second cover electrode 144. The thermal electron emitting part 130, the first cover electrode 142 and the second cover electrode 144 may be disposed at both end portions 111a and 111b of the fluorescent tube 110, respectively.

The fluorescent tube 110 includes a discharge tube 112 and a fluorescent layer 114 formed in the discharge tube 112.

The discharge tube 112 includes a transparent material transmitting the visible light. For example, the discharge tube 112 may include glass. The discharge tube 112 may further include an ultraviolet (UV)-proof material blocking the ultraviolet light.

A discharge space 120 is formed in the fluorescent tube 110, and a discharge gas is injected into the discharge space 120. For example, the discharge gas may include mercury (Hg), neon (Ne), or argon (Ar).

The thermal electron emitting parts 130 are formed at the end portions 111a and 111b of the fluorescent tube 110. In FIGS. 1 and 2, each of the thermal electron emitting parts 130 includes a filament 131, a first line 133 and a second line 135. For example, the filament 131 may be coated with barium (Ba) or strontium (Sr), so that electrons may be emitted from the filament 131. In an exemplary embodiment, each of the thermal electron emitting parts 130 has a plate shape, or a net shape.

The first and second lines 133 and 135 are electrically connected to end portions of the filament 131, respectively. The first and second lines 133 and 135 pass through each of the end portions 111a and 111b of the fluorescent tube 110. In FIGS. 1 and 2, end portions of the first and second lines 133 and 135 are disposed on substantially the same plane as a side surface 110a of the fluorescent tube 110. In an exemplary embodiment, the end portions of the first and second lines 133 and 135 may protrude from the side surface 110a of the fluorescent tube 110.

When a high voltage is applied to the filament 131, the filament 131 is heated to emit the electrons. In FIGS. 1 and 2, the filament 131 is heated at a temperature of about 900° C. to emit the electrons. The electrons are transported between the end portions 111a and 111b of the fluorescent tube 110 and collide with, for example, mercury atoms in the discharge space 120. Thus, a discharge is generated by the mercury gas and the electrons to generate the ultraviolet light.

When the ultraviolet light is incident into the fluorescent layer 114, the visible light is generated from the fluorescent layer 114.

A first cover electrode 142 is disposed at each end portion 111a of the fluorescent tube 110, and is electrically connected to the first line 133 of each of the thermal electron emitting parts 130.

A second cover electrode 144 is spaced apart from the first cover electrode 142 and is disposed at each end portion 111a of the fluorescent tube 110. The second cover electrode 144 is electrically connected to the second line 135 of each thermal electron emitting part 130.

In FIGS. 1 and 2, the first and second cover electrodes 142 and 144 are disposed facing each other. In an exemplary embodiment, the first and second cover electrodes 142 and 144 have a semi-cylindrical cap shape.

In an exemplary embodiment, the fluorescent lamp may further include an insulating part interposed between the first and second cover electrodes 142 and 144 to electrically insulate the first cover electrode 142 from the second cover electrode 144. In an exemplary embodiment, an aligning recess, an aligning groove, or a protrusion may be formed between the first and second cover electrodes 142 and 144 to align the fluorescent lamp.

Figure 3:
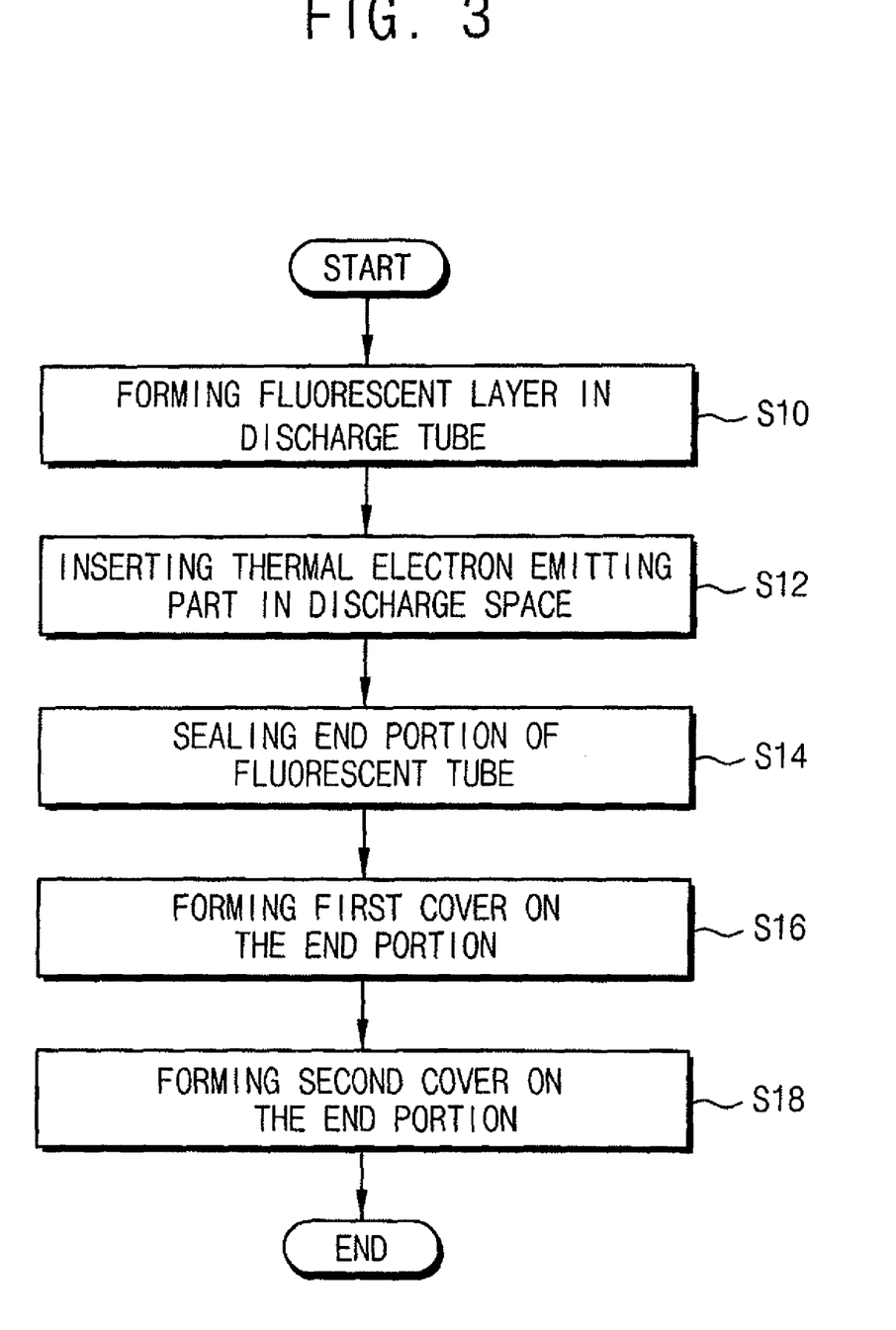
FIG. 3 is a flow chart illustrating a method of manufacturing a fluorescent lamp in accordance with an exemplary embodiment of the present invention.

FIG. 3 is a flow chart illustrating a method of manufacturing a fluorescent lamp shown in accordance with an exemplary embodiment of the present invention.

Referring to FIGS. 1 and 3, the fluorescent layer 114 is formed in the discharge tube 112 (step S10). For example, the fluorescent layer 114 may be formed through a depositing process or a coating process.

The thermal electron emitting parts 130 are inserted into end portions of the discharge space 120 (step S12).

The discharge gas is injected into the discharge space 120, and the end portions 111a and 111b of the fluorescent tube 110 are sealed (step S14). The end portions of the first and second lines 133 and 135 of the thermal electron emitting parts 130 are exposed to the exterior of the fluorescent tube 114.

The first cover electrode 142 electrically connected to the first line 133 is formed at the end portion 111a of the sealed fluorescent tube 110 (step S16). In FIGS. 1 to 3, a first silver paste is attached to the end portion 111a of the fluorescent tube 110 to form the first cover electrode 142. In an exemplary embodiment, a semi-cylindrical metal cap may be attached to the end portion 111a of the fluorescent tube 110 to form the first cover electrode 142.

The second cover electrode 144 spaced apart from the first cover electrode 142 and electrically connected to the second line 135 of each thermal electron emitting part 130 is formed at the end portion 111a of the sealed fluorescent tube 110 (step S18). In FIGS. 1 to 3, the second cover electrode 144 is formed through substantially the same method as the first cover electrode 142. For example, a second silver paste may be attached to the end portion 111a of the fluorescent tube 110 to form the second cover electrode 144.

According to an exemplary embodiment of the present invention, the fluorescent lamp includes the thermal electron emitting parts 130 to have lower power consumption and greater luminance than a cold cathode fluorescent lamp (CCFL).

The fluorescent lamp having the thermal electron emitting parts 130 has a greater dimming range than the CCFL, so that a display device having the fluorescent lamp may display an image having low luminance.

Figure 4:
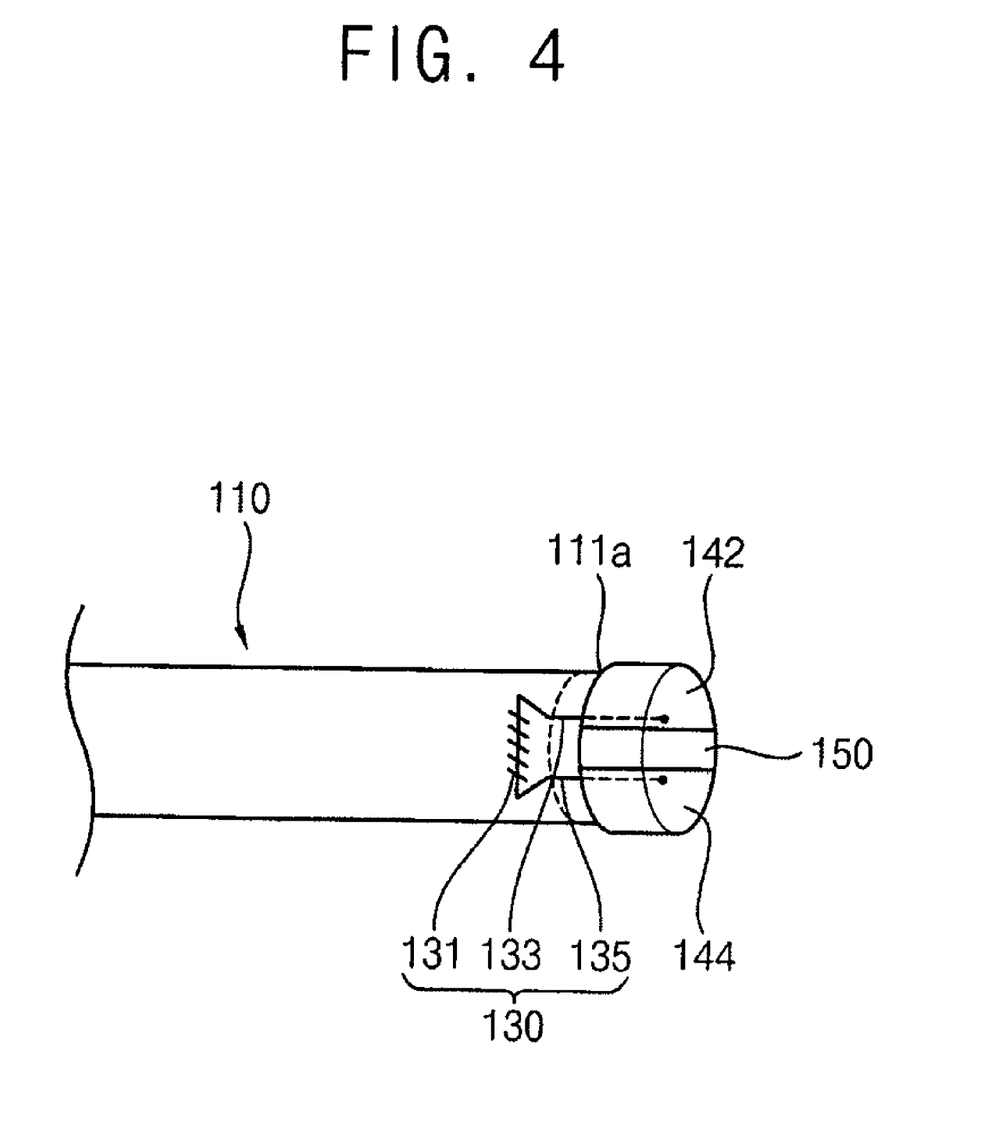
FIG. 4 is a perspective view illustrating a fluorescent lamp in accordance with an exemplary embodiment of the present invention.

FIG. 4 is a perspective view illustrating a fluorescent lamp in accordance with an exemplary embodiment of the present invention. The fluorescent lamp of FIG. 4 is substantially the same as in FIGS. 1 to 3 except for an insulating part.

Referring to FIG. 4, the fluorescent lamp includes the fluorescent tube 110, the thermal electron emitting part 130, the first cover electrode 142, the second cover electrode 144 and an insulating part 150.

The insulating part 150 is interposed between the first and second cover electrodes 142 and 144 to electrically insulate the first cover electrode 142 from the second cover electrode 144. In an exemplary embodiment, the insulating part 150 includes a metal oxide, and has substantially the same height as the first and second cover electrodes 142 and 144. The insulating part 150 protrudes toward the discharge space. In an exemplary embodiment, the insulating part 150 may protrude between the first and second cover electrodes 142 and 144, or may be recessed between the first and second cover electrodes 142 and 144.

Figure 5:
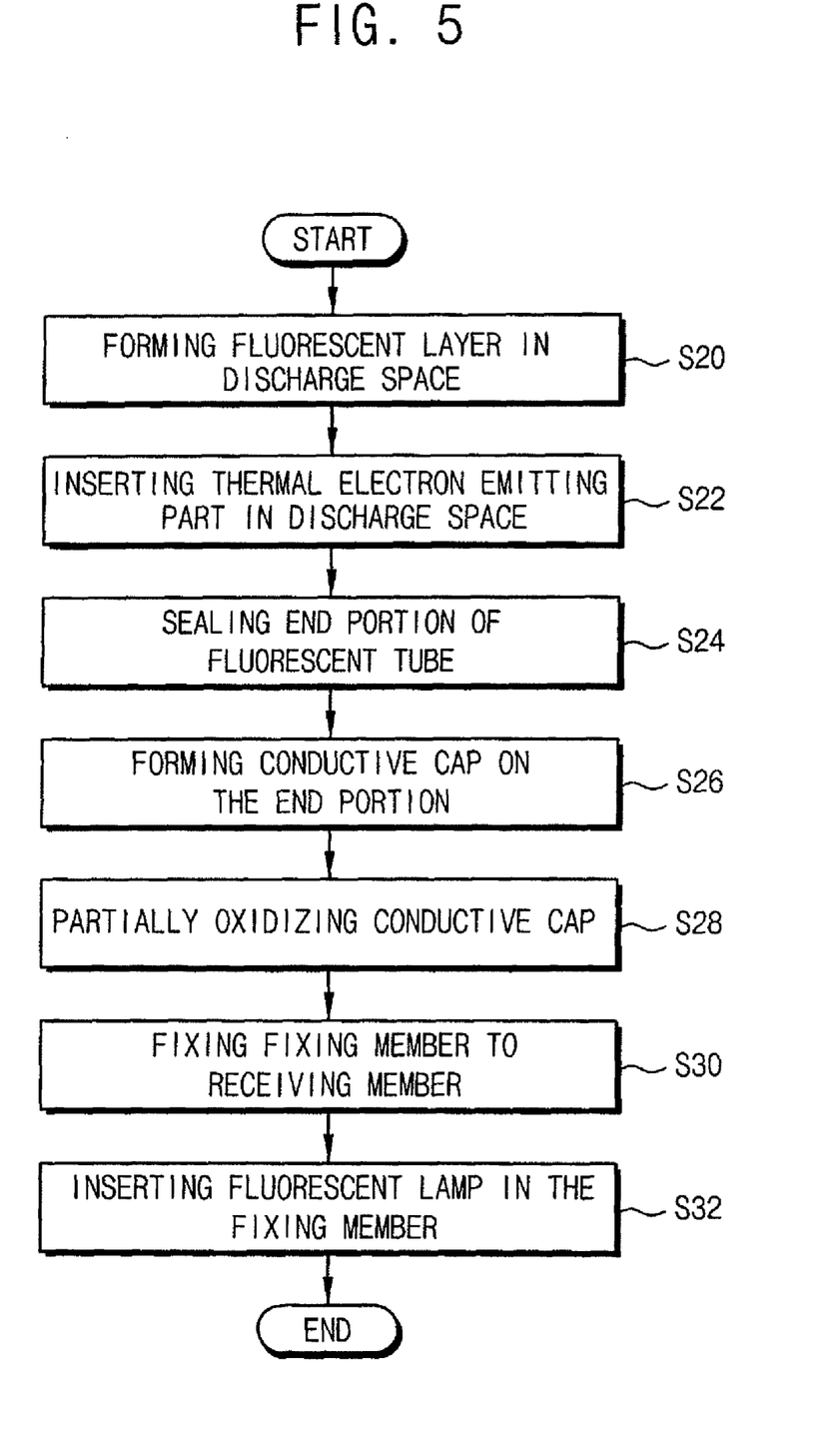
FIG. 5 is a flow chart illustrating a method of assembling a backlight assembly in accordance with an exemplary embodiment of the present invention.

FIG. 5 is a flow chart illustrating a method of assembling a backlight assembly in accordance with an exemplary embodiment of the present invention. Forming a fluorescent layer in a discharge tube (step S20), inserting the thermal electron emitting part 130 in the discharge space 120 (step S22) and sealing end portions 111a of the fluorescent tube 110 (step S24) of FIG. 5 is substantially the same as the method described in connection with FIG. 3.

Referring to FIGS. 4 and 5, a conductive cap electrically connected to first and second lines 133 and 135 of the thermal electron emitting part 130 is formed at an end portion 111a of the sealed fluorescent tube 110 (step S26). The conductive cap may be formed through, for example, applying a silver paste, attaching a metal cap, depositing a metal, or plating a metal layer.

A portion of the conductive cap between the first and second lines 133 and 135 is oxidized to form the insulating part 150 (step S28). Thus, the insulating part 150, the first cover electrode 142 and the second cover electrode 144 are formed at the end portion 111a of the sealed fluorescent tube 110. In FIGS. 4 and 5, the insulating part 150 is disposed along a central line of the conductive cap.

In an exemplary embodiment, two semi-cylindrical caps may be attached to the end portion 111a of the fluorescent tube 110, and an insulating layer may be formed between the semi-cylindrical caps to form the insulating part 150.

A fixing member is fixed to a receiving member (step S30).

The fluorescent lamp is inserted in the fixing member, so that the fixing member holds the fluorescent lamp (step S32).

According to an exemplary embodiment of the present invention, the first cover electrode 142 is electrically insulated from the second cover electrode 144 by the insulating part 150 so that electrical characteristics of the fluorescent lamp may be improved.

The first and second cover electrodes 142 and 144 can be simultaneously formed with the insulating part 150 so that an assembling process of the backlight assembly may be simplified and the backlight assembly may be assembled through automated processes.

Figure 6:
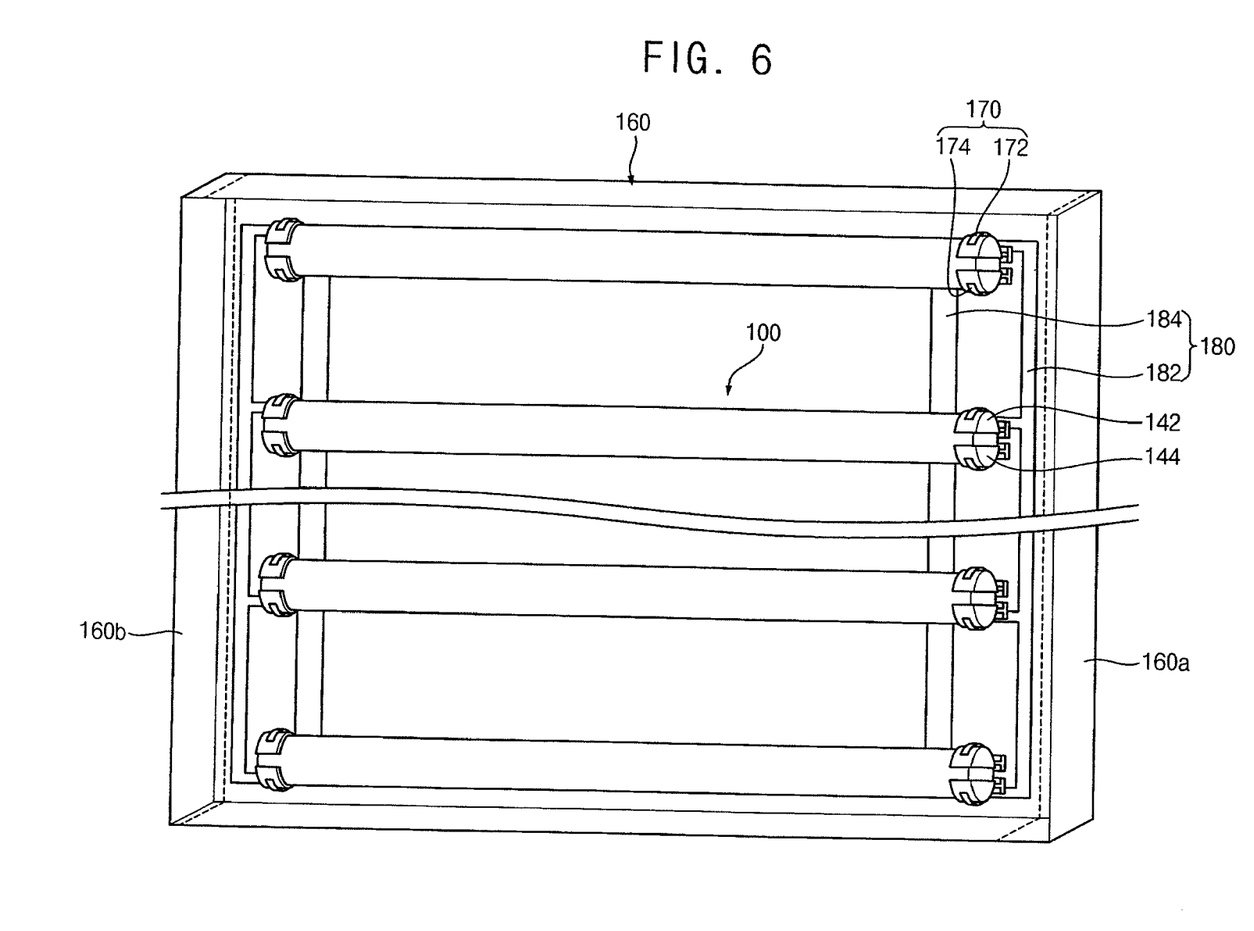
FIG. 6 is a perspective view illustrating a backlight assembly in accordance with an exemplary embodiment of the present invention.
Figure 7:
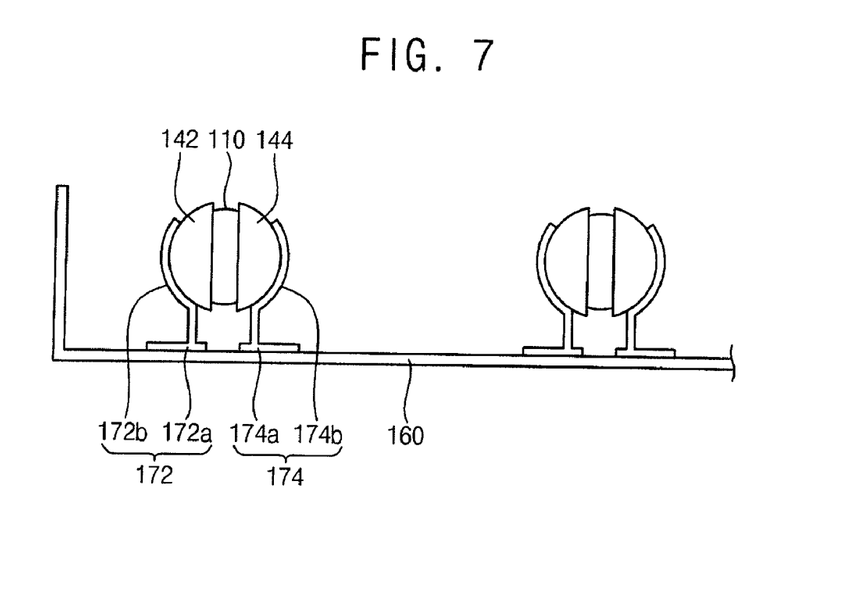
FIG. 7 is a side view illustrating a backlight assembly in accordance with an exemplary embodiment of the present invention.

FIG. 6 is a perspective view illustrating a backlight assembly in accordance with an exemplary embodiment of the present invention. FIG. 7 is a side view illustrating a backlight assembly in accordance with an exemplary embodiment of the present invention.

Referring to FIGS. 6 and 7, the backlight assembly includes a receiving container 160, a socket member 170, a power supply wiring 180 and a fluorescent lamp 100. In an exemplary embodiment, the backlight assembly may further include a plurality of socket members 170, a plurality of power supply wirings 180 and a plurality of fluorescent lamps 100.

The receiving container 160 includes a bottom plate and a plurality of sidewalls protruding from sides of the bottom plate to form a receiving space. The receiving container 160 may further include a reflecting plate (not shown) on the bottom plate to reflect light generated from the fluorescent lamp 100.

The receiving container 160 may further include a bottom chassis (not shown) and a mold frame (not shown) disposed in the bottom chassis. The socket member 170 may be disposed on the mold frame.

The socket members 170 protrude from the bottom plate of the receiving container 160 to hold the fluorescent lamps 100. The socket members 170 are formed adjacent end portions 160a and 160b of the receiving container 160.

Each socket member 170 includes a first socket 172 contacting a first cover electrode 142 of the fluorescent lamp 100 and a second socket 174 contacting a second cover electrode 144 of the fluorescent lamp 100. The first and second sockets 172 and 174 are formed facing each other. The first and second sockets 172 and 174 may include metal.

A first fixing portion 172a of the first socket 172 and a second fixing portion 174a of the second socket 174 are formed on the bottom plate of the receiving container 160. In an exemplary embodiment, the first and second fixing portions 172a and 174a of the first and second sockets 172 and 174 are fixed to the bottom plate through, for example, a hook combination or a screw combination.

A first supporting portion 172b of the first socket 172 and a second supporting portion 174b of the second socket 174 hold the first and second cover electrodes 142 and 144 of the fluorescent lamp 100 of the first and second sockets 172 and 174. Elasticity may be used to hold the first and second cover electrodes 142 and 144. In FIGS. 6 and 7, the fluorescent lamp 100 may be inserted into a space between the first and second sockets 172 and 174 so that a manufacturing process of the backlight assembly may be simplified.

The power supply wiring 180 is electrically connected to an inverter (not shown) to apply electric power to the fluorescent lamp 100 through the first and second sockets 172 and 174.

The power supply wiring 180 includes a first power supply line 182 electrically connected to the first socket 172 and a second power supply line electrically connected to the second socket 174. In FIGS. 6 and 7, the first power supply line 182 is electrically connected to a plurality of first sockets 172 so that a plurality of fluorescent lamps 100 can be electrically connected in parallel to each other. In an exemplary embodiment, the fluorescent lamps 100 may be divided into a plurality of groups, and each power supply line 180 may be electrically connected to each group of the fluorescent lamps 100.

In an exemplary embodiment, the backlight assembly may further include an optical member (not shown) on the fluorescent lamps 100 to improve optical characteristics of the light generated from the fluorescent lamps 100.

According to an exemplary embodiment of the present invention, the end portion of the fluorescent lamp 100 may be inserted in the socket member 170, so that a manufacturing process of the backlight assembly may be simplified.

The fluorescent lamps 100 may be electrically connected in parallel to each other, so that the number of the inverters may be decreased.

Figure 8:
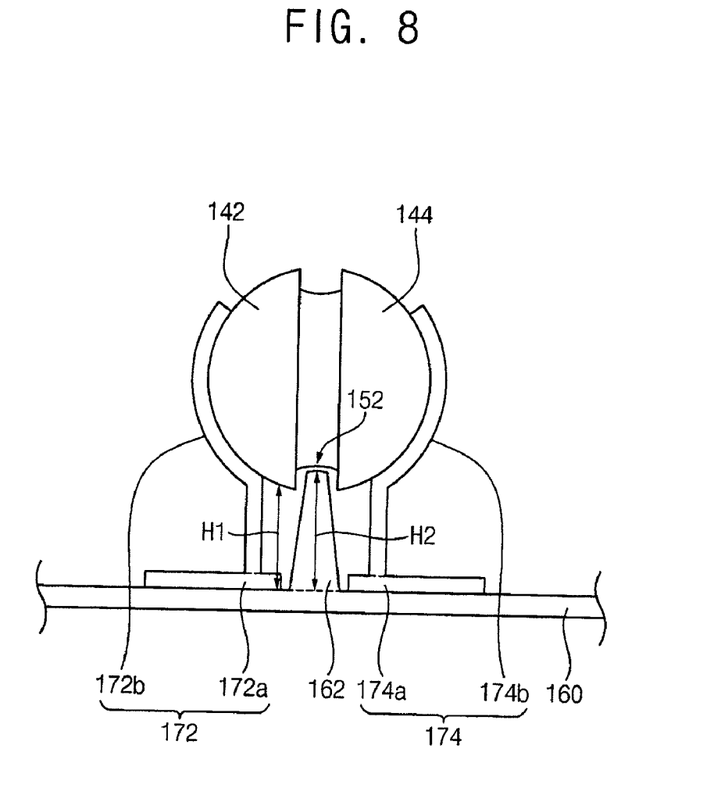
FIG. 8 is a side view illustrating a backlight assembly in accordance with an exemplary embodiment of the present invention.

FIG. 8 is a side view illustrating a backlight assembly in accordance with an exemplary embodiment of the present invention. The backlight assembly of FIG. 8 is substantially the same as in FIGS. 6 and 7 except for an alignment protrusion and an alignment recess.

Referring to FIGS. 6 and 8, the alignment recess 152 is formed between a first cover electrode 142 and a second cover electrode 144 of the fluorescent lamp 100. In an exemplary embodiment, the alignment recess 152 may be formed during sealing end portions of the fluorescent tube 110 of the fluorescent lamp 100. For example, the alignment recess 152 may be formed through a molding process.

A receiving container 160 includes a bottom plate, a sidewall and an alignment protrusion 162.

The alignment protrusion 162 protrudes between a first socket 172 and a second socket 174. An upper portion of the alignment protrusion 162 is inserted into the alignment recess 152, thereby aligning the fluorescent lamp 100. When the receiving container 160 does not have the alignment protrusion 162, the fluorescent lamp 100 may be rotated during a fabrication process so that the first and second sockets 172 and 174 may be shorted by the first cover electrode 142 or the second cover electrode 144. However, in an exemplary embodiment, the alignment protrusion 162 and the alignment recess 152 prevent the rotation of the fluorescent lamp 100 to prevent the short circuit between the first and second sockets 172 and 174.

A distance H1 between the bottom plate of the receiving container 160 and each of the first and second sockets 172 and 174 may be smaller than a height H2 of the alignment protrusion 162.

According to an exemplary embodiment of the present invention, the alignment protrusion 162 is inserted into the alignment recess 152 to prevent the first and second sockets 172 and 174 from being shorted by the first cover electrode 142 or the second cover electrode 144.

Figure 9:
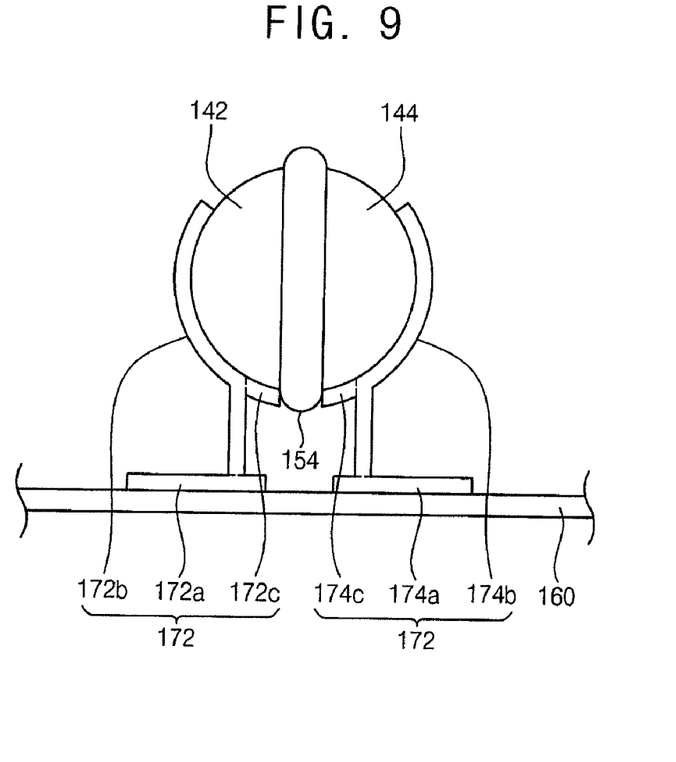
FIG. 9 is a side view illustrating a backlight assembly in accordance with an exemplary embodiment of the present invention.

FIG. 9 is a side view illustrating a backlight assembly in accordance with an exemplary embodiment of the present invention. The backlight assembly of FIG. 9 is substantially the same as the backlight assembly in FIGS. 6 and 7 except for an insulating part, a first cover electrode and a second cover electrode.

Referring to FIG. 9, the insulating part 154 is formed between the first cover electrode 142 and the second cover electrode 144 of the fluorescent lamp 100. The insulating part 154 includes glass, and protrudes towards the discharge space.

In exemplary embodiment, the insulating part 154 is formed during sealing end portions of the fluorescent tube 110. The first and second cover electrodes 142 and 144 are attached to the end portions of the fluorescent tube 110 after the insulating part 154 is formed.

A first socket 172 includes a first fixing portion 172a, a first supporting portion 172b and a first guiding portion 172c. The first fixing portion 172a is attached to a bottom plate of the receiving container 160. The first supporting portion 172b protrudes from the first fixing portion 172a to support the first cover electrode 142. The first guiding portion 172c is connected to the first supporting portion 172b to guide a side of the insulating part 154.

The second socket 174 includes a second fixing portion 174a, a second supporting portion 174b and a second guiding portion 174c. The second fixing portion 174a is spaced apart from the first fixing portion 172a. The second supporting portion 174b supports the second cover electrode 144 to hold the fluorescent lamp 100. The second guiding portion 174c guides an opposite side of the insulating part 154.

The insulating part 154 is located between the first and second guiding portions 172c and 174c to prevent the fluorescent lamp 100 held by the first and second supporting portions 172a and 174a from rotating. In an exemplary embodiment, the first and second guiding portions 172c and 174c may be omitted, and a distance between the first and second sockets 172 and 174 may be adjusted to hold the insulating part 154 therebetween.

According to an exemplary embodiment of the present invention, the first and second sockets 172 and 174 are prevented from being shorted by the first cover electrode 142 or the second cover electrode 144.

Figure 10:
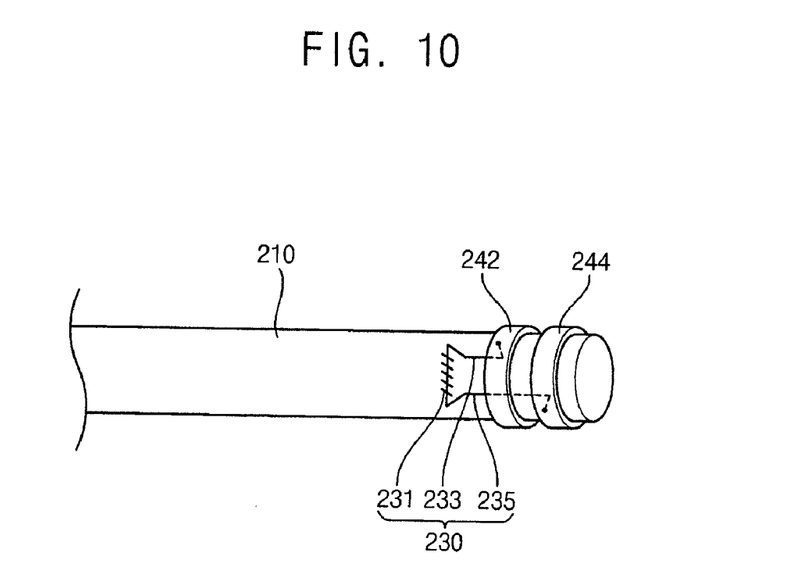
FIG. 10 is a perspective view illustrating a fluorescent lamp in accordance with an exemplary embodiment of the present invention.
Figure 11:
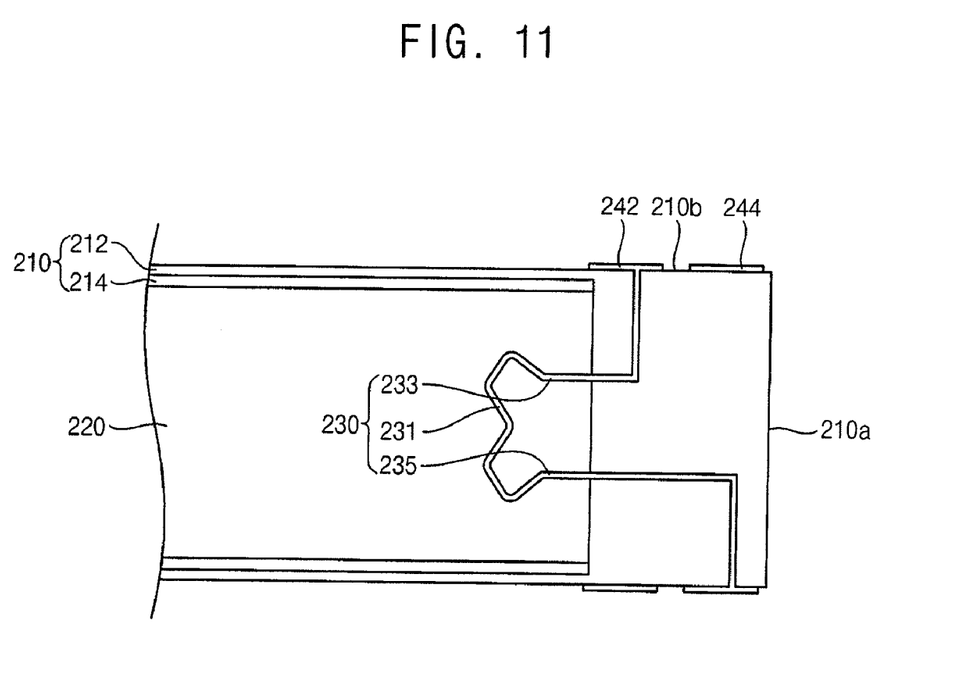
FIG. 11 is a cross-sectional view illustrating a fluorescent lamp in accordance with an exemplary embodiment of the present invention.

FIG. 10 is a perspective view illustrating a fluorescent lamp in accordance with an exemplary embodiment of the present invention. FIG. 11 is a cross-sectional view illustrating a fluorescent lamp in accordance with an exemplary embodiment of the present invention. The fluorescent lamp of FIGS. 10 and 11 is substantially the same as the fluorescent lamp in FIGS. 1 and 2 except for a thermal electron emitting part, a first cover electrode and a second cover electrode.

Referring to FIGS. 10 and 11, the thermal electron emitting part 230 is disposed at an end portion of a fluorescent tube 210, and includes a filament 231, a first line 233 and a second line 235.

The first and second lines 233 and 235 are electrically connected to end portions of the filament 231, respectively. Each of the first and second lines 233 and 235 is bent toward an outer surface 210b of the fluorescent tube 210. In FIGS. 10 and 11, end portions of the first and second lines 233 and 235 may be disposed on substantially the same plane as the outer surface 210b of the fluorescent tube 210.

Each of the first and second cover electrodes 242 and 244 may have a ring shape at the end portion of the fluorescent tube 210. The first and second cover electrodes 242 and 244 are disposed substantially parallel with each other on the outer surface 210b of the fluorescent tube 210. The first and second cover electrodes 242 and 244 may partially cover the outer surface 210b of the fluorescent tube 210.

The first and second cover electrodes 242 and 244 are electrically connected to the first and second lines 233 and 235 of the thermal electron emitting part 230.

In an exemplary embodiment, the fluorescent lamp may further include an insulating part (not shown) formed between the first and second cover electrodes 242 and 244 to electrically insulate the first cover electrode 242 from the second cover electrode 244. For example, the insulating part may be formed on substantially the same plane as the first and second cover electrodes 242 and 244. The insulating part may protrude toward the discharge space. In an exemplary embodiment, the insulating part may protrude between the first and second cover electrodes 242 and 244, or may be recessed between the first and second cover electrodes 242 and 244.

According to an exemplary embodiment of the present invention, the first and second cover electrodes 242 and 244 disposed at the end portion of the fluorescent tube 210 have the ring shape, so that electric power may be applied to the fluorescent lamp regardless of an alignment direction of the fluorescent lamp. In an exemplary embodiment, the fluorescent lamp securely receives the electric power, although the fluorescent lamp is rotated.

Figure 12:
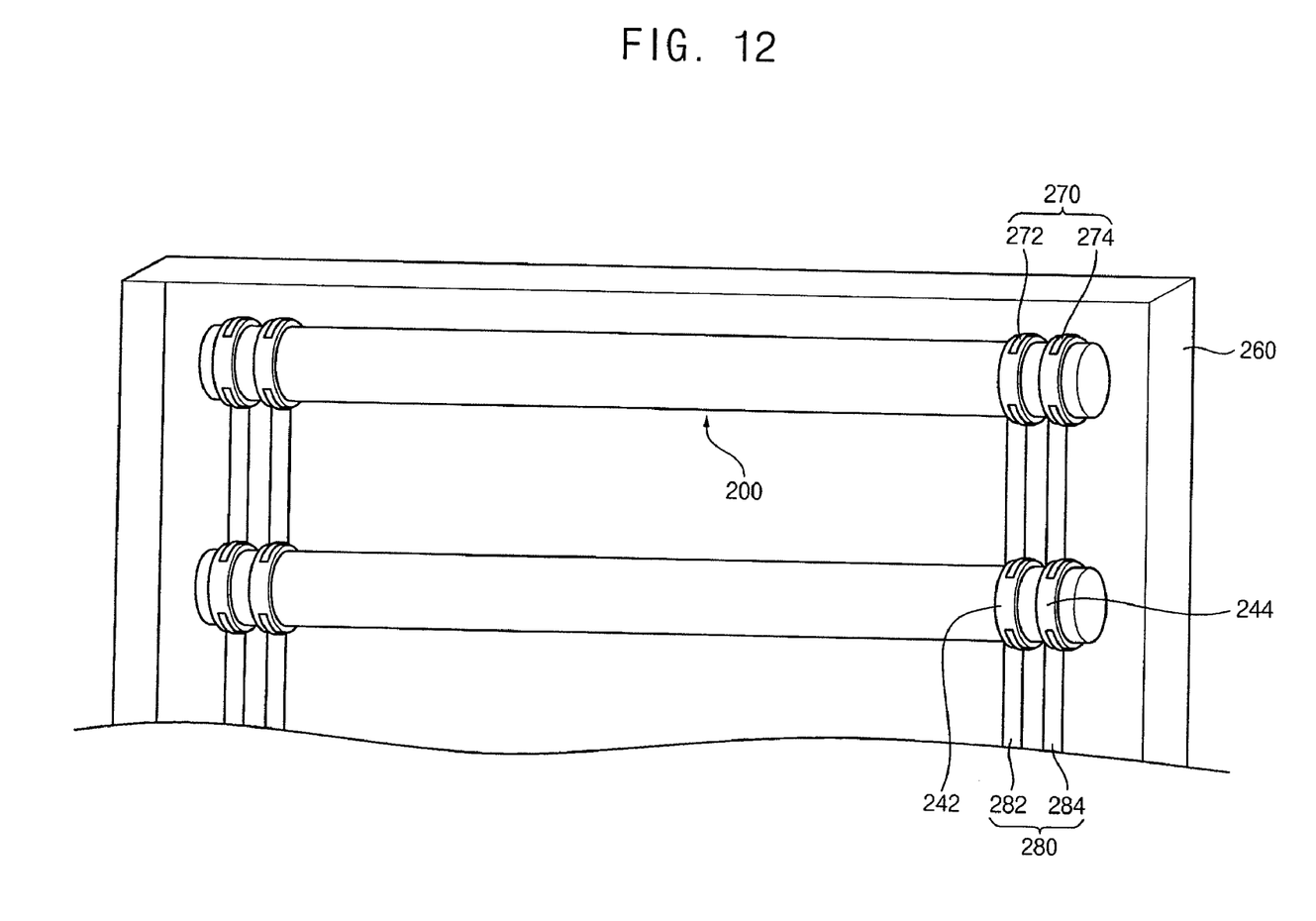
FIG. 12 is a perspective view illustrating a backlight assembly in accordance with an exemplary embodiment of the present invention.
Figure 13:
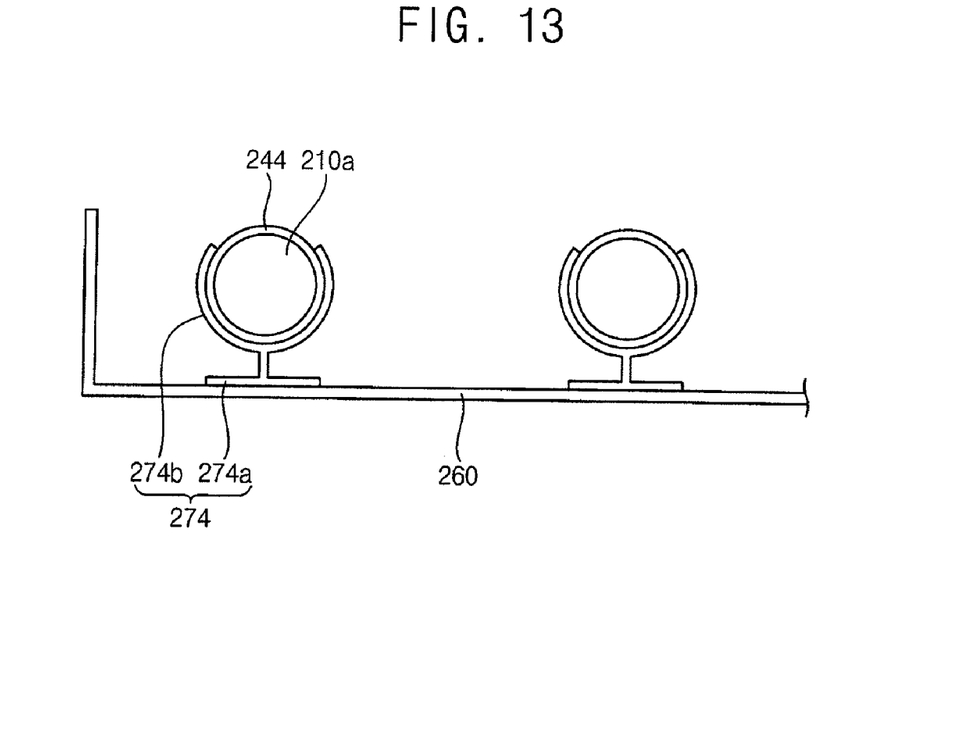
FIG. 13 is a side view illustrating a backlight assembly in accordance with an exemplary embodiment of the present invention.

FIG. 12 is a perspective view illustrating a backlight assembly in accordance with an exemplary embodiment of the present invention. FIG. 13 is a side view illustrating a backlight assembly in accordance with an exemplary embodiment of the present invention. The backlight assembly of FIGS. 12 and 13 is substantially the same as the backlight assembly in FIGS. 6 and 7 except for a fluorescent lamp, a socket member and a power supply wiring.

Referring to FIGS. 12 and 13, the backlight assembly includes the fluorescent lamp 200, a receiving container 260, a socket member 270 and a power supply wiring 280.

The socket member 270 includes a first socket 272 and a second socket 274. The first socket 272 contacts a first cover electrode 242 of the fluorescent lamp 200. The second socket 274 contacts a second cover electrode 244 of the fluorescent lamp 200. The first and second sockets 272 and 274 are disposed substantially parallel with each other.

The first socket 272 includes a first fixing portion (not shown) formed at a bottom plate of the receiving container 260 and a first holding portion protruding from the first fixing portion to hold the first cover electrode 242. In an exemplary embodiment, the first holding portion is extended along opposite sides of the first cover electrode 242. For example, the first holding portion may have a ring shape having an opening.

The second socket 274 includes a second fixing portion 274a and a second holding portion 274b. The second fixing portion 274a is aligned substantially parallel with the first fixing portion on the bottom plate. The second holding portion 274b protrudes from the second fixing portion 274a to hold the second cover electrode 244. In an exemplary embodiment, the second holding portion 274b may have substantially the same shape as the first holding portion.

For example, the first and second sockets 272 and 274 may have substantially the same shape, and hold the end portion of the fluorescent lamp 200.

The power supply wiring 280 includes a first power supply line 282 electrically connected to the first socket 272 and a second power supply line 284 electrically connected to the second socket 274.

In an exemplary embodiment, each of the first and second power supply lines 282 and 284 has a substantially linear shape, and the first and second power supply lines 282 and 284 are aligned substantially parallel with each other.

According to an exemplary embodiment of the present invention, the first socket 272 and the second socket 274 may not be shorted when the fluorescent lamp 200 rotates.

In an exemplary embodiment, the fluorescent lamp 200 has a greater diameter than an external electrode fluorescent lamp (EEFL) so that the fluorescent lamp 200 may be securely combined with the socket member 170.

Figure 14:
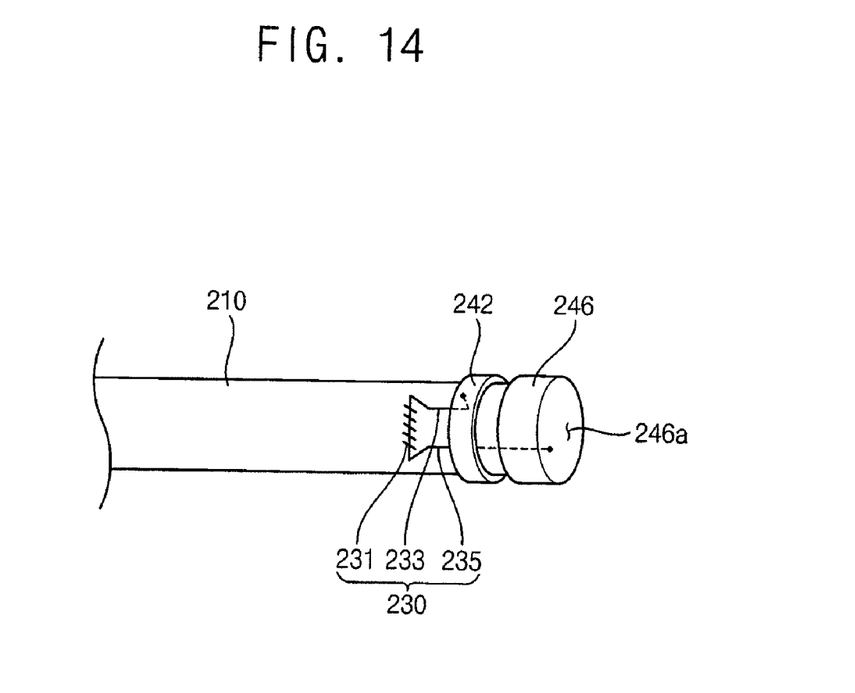
FIG. 14 is a perspective view illustrating a fluorescent lamp in accordance with an exemplary embodiment of the present invention.

FIG. 14 is a perspective view illustrating a fluorescent lamp in accordance with an exemplary embodiment of the present invention. The fluorescent lamp of FIG. 14 is substantially the same as in FIGS. 10 and 11 except for a second line and a second cover electrode.

Referring to FIG. 14, a first line 233 of a thermal electron emitting part 230 is bent toward an outer surface 210b (shown in FIG. 11) of the fluorescent tube 210. The first line 233 is electrically connected to a first cover electrode 242 disposed at an end portion of the fluorescent tube 210. The first cover electrode 242 may have a ring shape partially covering the outer surface 210b of the fluorescent tube 210.

The second line 235 passes through an end portion of the fluorescent tube 210 to be electrically connected to a second cover electrode 246 disposed at the end portion of the fluorescent tube 210 and is electrically connected to a second cover electrode 246 having a cylindrical cap shape. In an exemplary embodiment, an end portion of the second line 235 is disposed on substantially the same plane as the side surface 210a of the fluorescent tube 210, and the side surface 210a of the fluorescent tube 210 is covered by a side surface 246a of the second cover electrode 246.

The first cover electrode 242 is disposed at the end portion of the fluorescent tube 210 and is substantially parallel with the second cover electrode 246.

According to an exemplary embodiment of the present invention, the second cover electrode 246 covers the side surface 210a of the fluorescent tube 210.

Figure 15:
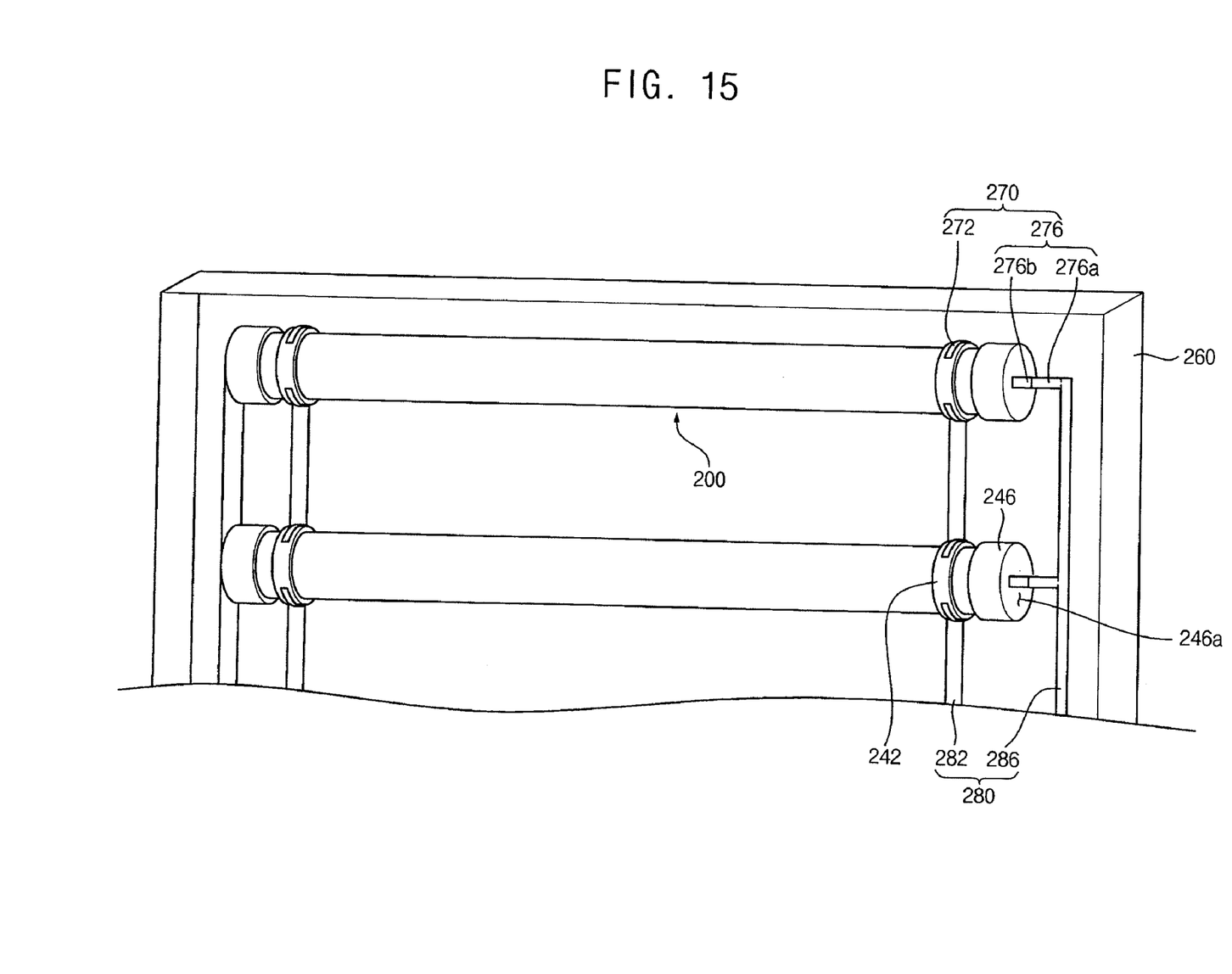
FIG. 15 is a perspective view illustrating a backlight assembly in accordance with an exemplary embodiment of the present invention.

FIG. 15 is a perspective view illustrating a backlight assembly in accordance with an exemplary embodiment of the present invention. The backlight assembly of FIG. 15 is substantially the same as in FIGS. 12 and 13 except for a second socket and a second power supply line.

Referring to FIG. 15, two socket members 270 are disposed at two end portions of the fluorescent lamp 200.

Each of the socket members 270 includes a first socket 272 and a second socket 276.

The first socket 272 holds a first cover electrode 242 of the fluorescent lamp 200.

The second socket 276 contacts a second cover electrode 246 of the fluorescent lamp 200. The second socket 276 includes a second fixing portion 276a and a second holding portion 276b. The second fixing portion 276a is formed at a bottom plate of the receiving container 260. In an exemplary embodiment, the second fixing portion 276a is fixed to a bottom of the receiving container 260. The second holding portion 276b protrudes from the second fixing portion 276a and contacts a side surface 246a of the second cover electrode 246.

The second power supply line 286 has a linear shape, and transmits electric power to the second cover electrode 246 through the second socket 276.

According to an exemplary embodiment of the present invention, the two second sockets 276 on the two sides of the fluorescent lamp 200 supports the two side surfaces of the fluorescent lamp 200 to dispose the fluorescent lamp 200 in a longitudinal direction of the fluorescent lamp 200.

In an exemplary embodiment, the backlight assembly is a direct illumination type backlight assembly. In an exemplary embodiment, the backlight assembly may be an edge illumination type backlight assembly that includes a light-guiding plate (not shown).

According to an exemplary embodiment of the present invention, a fluorescent lamp includes a thermal electron emission part, and has lower power consumption, greater luminance and greater dimming range than the CCFL.

In an exemplary embodiment of the present invention, the electrical characteristics of the fluorescent lamp may be improved by an insulating part interposed between first and second cover electrodes. The first cover electrode can be simultaneously formed with the second cover electrode, so that the manufacturing process of the fluorescent lamp may be simplified.

An alignment protrusion of a receiving container can be inserted into an alignment recess of the fluorescent lamp to prevent first and second sockets from being shorted by the first cover electrode or the second cover electrode.

The fluorescent lamp may have a greater diameter than an external electrode fluorescent lamp (EEFL) to be securely combined with the socket member. A plurality of the fluorescent lamps can be electrically connected to each other in parallel, so that the number of inverters may be decreased.

Each of the first and second cover electrodes on the same end portion of the fluorescent tube may have the ring shape, so that the electric power may be applied to the fluorescent lamp regardless of the alignment direction of the fluorescent lamp.

Although the illustrative embodiments of the present invention have been described herein with reference to the accompanying drawings, it is to be understood that the present invention should not be limited to those precise embodiments and that various other changes and modifications may be affected therein by one of ordinary skill in the related art without departing from the scope or spirit of the invention. All such changes and modifications are intended to be included within the scope of the invention as defined by the appended claims.

What is claimed is:

1. A backlight assembly comprising:
a receiving container;
a fluorescent lamp including:
a fluorescent tube having a discharge space,
a thermal electron emitting part disposed in the discharge space,
a first cover electrode disposed at first end portion of the fluorescent tube, wherein the first cover electrode is electrically connected to a first end portion of the thermal electron emitting part, and
a second cover electrode separated from the first cover electrode and disposed at the first end portion of the fluorescent tube, wherein the second cover electrode is electrically connected to a second end portion of the thermal electron emitting part; and
a fixing member holding the fluorescent lamp and fixed to the receiving container,
wherein the thermal electron emitting part is electrically connected to the first cover electrode and the second cover electrode.

2. The backlight assembly of claim 1, wherein the fixing member comprises a first fixing part electrically connected to the first cover electrode and a second fixing part electrically connected to the second cover electrode, and wherein the first fixing part is disposed to face the second fixing part.

3. The backlight assembly of claim 2, wherein the first and second cover electrodes have semi-cylindrical cap shapes.

4. The backlight assembly of claim 3, wherein the fluorescent lamp further comprises an insulating part protruding toward the discharge space.

5. The backlight assembly of claim 1, wherein an alignment recess is formed between the first and second cover electrodes of the fluorescent lamp.

6. The backlight assembly of claim 5, wherein the receiving container further comprises an alignment protrusion protruding toward the discharge space and corresponding to the alignment recess.

7. The backlight assembly of claim 1, wherein the fixing member comprises a first fixing part electrically connected to the first cover electrode and a second fixing part electrically connected to the second cover electrode, and wherein the second fixing part is substantially parallel with the first fixing part.

8. The backlight assembly of claim 1, wherein the first and second cover electrodes partially cover an outer surface of the fluorescent tube.

9. The backlight assembly of claim 1, wherein the second cover electrode and the first cover electrode have a cylindrical cap shape and a ring shape partially covering an outer surface of the fluorescent tube and being substantially parallel with the second cover electrode.

10. The backlight assembly of claim 9, wherein the fixing member comprises a first fixing part supporting the first electrode and a second fixing part supporting a side surface of the second electrode.

11. The backlight assembly of claim 1, further comprising:

a plurality of fluorescent lamps substantially in parallel with each other in the receiving container;

a plurality of fixing members fixing the fluorescent lamps to the receiving container; and a power supply member electrically connected to the fluorescent lamps in serial through the fixing members.

12. The backlight assembly of claim 1, wherein the fixing member has a clip shape to hold the fluorescent lamp.

* * * * *